United States Patent
Milan et al.

(10) Patent No.: US 10,831,756 B2
(45) Date of Patent: Nov. 10, 2020

(54) ENHANCED SEARCHING OF DATA IN A COMPUTER MEMORY

(71) Applicant: RED HAT, INC., Raleigh, NC (US)

(72) Inventors: Julius Milan, Kovacova (SK); Matej Marusak, Nova Dedina (SK)

(73) Assignee: Red Hat, Inc., Raleigh, NC (US)

( * ) Notice: Subject to any disclaimer, the term of this patent is extended or adjusted under 35 U.S.C. 154(b) by 382 days.

(21) Appl. No.: 15/844,702

(22) Filed: Dec. 18, 2017

(65) Prior Publication Data

US 2019/0188300 A1   Jun. 20, 2019

(51) Int. Cl.
| | |
|---|---|
| *G06F 7/02* | (2006.01) |
| *G06F 16/00* | (2019.01) |
| *G06F 16/2455* | (2019.01) |
| *G06F 7/24* | (2006.01) |
| *G06F 16/9535* | (2019.01) |
| *G06F 3/06* | (2006.01) |
| *G06F 9/455* | (2018.01) |

(52) U.S. Cl.
CPC ........ *G06F 16/24553* (2019.01); *G06F 3/061* (2013.01); *G06F 7/24* (2013.01); *G06F 16/9535* (2019.01); *G06F 2009/45583* (2013.01)

(58) Field of Classification Search
CPC .. G06F 16/24553; G06F 16/9535; G06F 7/24; G06F 3/0361; G06F 3/0611; G06F 3/064; G06F 16/00; G06F 2009/45583
See application file for complete search history.

(56) References Cited

U.S. PATENT DOCUMENTS

| | | | |
|---|---|---|---|
| 5,950,191 A | * | 9/1999 | Schwartz ............ G06F 16/9024 707/758 |
| 9,154,335 B2 | | 10/2015 | Goikhman |
| 2013/0124491 A1 | | 5/2013 | Pepper et al. |
| 2017/0102879 A1 | * | 4/2017 | Benisty .................. G06F 3/0604 |
| 2018/0268005 A1 | * | 9/2018 | Chen ....................... G06F 16/35 |

OTHER PUBLICATIONS

DeCouto, Douglas and Napoli, Joshua, "1D Binary Seaching: a warmup," 6.838 Lecture 13 on groups.csail.mit.edu, Mar. 18, 1998. (Year: 1998).*

(Continued)

*Primary Examiner* — Bruce M Moser
(74) *Attorney, Agent, or Firm* — Kilpatrick Townsend & Stockton LLP

(57) ABSTRACT

Data searching in a computer memory can be enhanced using a memory-searching process (MSP) that includes identifying a key that is in a middle position in a range of keys defined by a lower key-boundary and an upper key-boundary. The MSP can also include determining that the key is in a particular position in a range of values defined by a lower value-boundary and an upper value-boundary. The MSP can further include executing another iteration using (i) the particular position minus one as a new upper value-boundary, and (ii) the middle position of the key minus one as a new upper key-boundary for the range of keys. The MSP can additionally or alternatively include executing another iteration using (i) the particular position, or the particular position plus one, as a new lower value-boundary, and (ii) the middle position of the key plus one as a new lower key-boundary.

20 Claims, 11 Drawing Sheets

(56) References Cited

OTHER PUBLICATIONS

Decent Dabbler, "php—Binary Search algorithm for non-overlapping time spans and possible gaps," taken from codereview/stackexchange.com, Dec. 25, 2012. (Year: 2012).*
Tarek, A., "A New Approach for Multiple Element Binary Search in Database Applications," International Journal of Computers, 2007, 4(1):269-279.
Tarek, A., "A New Algorithm for Tiered Binary Search," Int'l Conf. Foundations of Computer Science, 2017, pp. 25-31.
Lovro, "Binary Search," 2017 https://www.topcoder.com/community/data-science/data-science-tutorials/binary-search/.

* cited by examiner

```
0   void _mmkbs (const int *arr, int arr_l, int arr_r,
1                const int *keys, int keys_l, int keys_r,
2                int *results)
3   {
4       if (keys_r - keys_l < 0)
5           return;
6
7       int keys_middle = MIDDLE(keys_l, keys_r);
8
9       /* throw away half of keys if the middle key is out */
10      if (keys[keys_middle] < arr[arr_l]) {
11          _mmkbs(arr, arr_l, arr_r,
12                 keys, keys_middle + 1, keys_r, results);
13          return;
14      }
15      if (keys[keys_middle] > arr[arr_r]) {
16          _mmkbs(arr, arr_l, arr_r,
17                 keys, keys_l, keys_middle - 1, results);
18          return;
19      }
20
21      bool found;
22      int pos = bs(arr, arr_l, arr_r, keys[keys_middle], &found);
23
24      if (found)
25          results[keys_middle] = pos;
26
27      _mmkbs(arr, arr_l, pos - 1,
28             keys, keys_l, keys_middle - 1, results);
29      _mmkbs(arr, (found) ? pos + 1 : pos, arr_r,
30             keys, keys_middle + 1, keys_r, results);
31  }
32
33  void mmkbs (const int *arr, int N,
34              const int *keys, int M,
35              int *results)
36  {   _mmkbs(arr, 0, N - 1, keys, 0, M - 1, results);   }
```

FIG. 2

```
int _bs (const int *arr, int left, int right, int key,
         bool *found)
{
    int middle = MIDDLE(left, right);

while (left <= right) {
        if (key < arr[middle])
            right = middle - 1;
        else if (key == arr[middle]) {
            *found = true;
            return middle;
        }
        else
            left = middle + 1;
        middle = MIDDLE(left, right);
    }

*found = false;
    /* left points to the position of first bigger element */
    return left;
}
```

FIG. 3

ENHANCED SEARCHING OF DATA IN A COMPUTER MEMORY

TECHNICAL FIELD

The present disclosure relates generally to data processing. More specifically, but not by way of limitation, this disclosure relates to enhanced searching of data in a computer memory.

BACKGROUND

Various types of data can be stored in a computer memory, such as a hard disk or random access memory (RAM). For a variety of reasons, a processing device may need to compare a set of keys (e.g., numerical values) to the data stored in the computer memory to determine if there is an overlap between the two. For example, to avoid saving duplicate information in the computer memory, which may consume memory unnecessarily, a processing device may compare a set of keys to a set of values already stored in the computer memory to determine which, if any, of the keys already exist in the computer memory. The processing device may then discard keys that already exist in the computer memory and save any keys that do not exist in the computer memory.

Traditionally, a processing device determines which keys are already stored in a computer memory by sequentially searching for each key in the computer memory. For example, if the set of keys includes 100 keys, the processing device may begin by searching for the first key in the set of keys, then search for the second key in the set of keys, then search for the third key in the set of keys, and so on, until the processing device has searched for all of the keys.

BRIEF DESCRIPTION OF THE DRAWINGS

FIG. 2 is an example of program code for implementing a memory-searching process according to some aspects.

FIG. 3 is an example of program code for implementing a binary search process according to some aspects.

DETAILED DESCRIPTION

Figure 1:
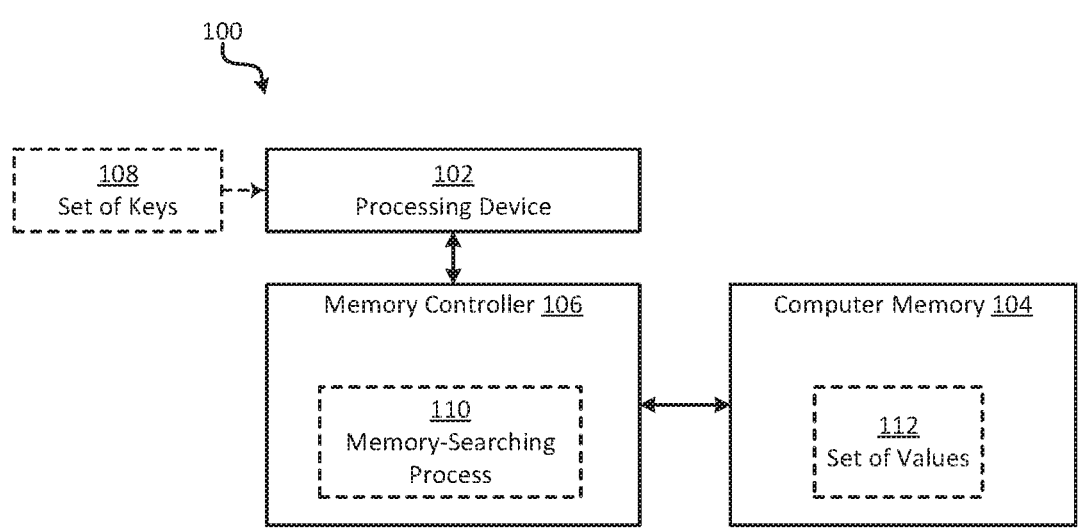
FIG. 1 is a block diagram of an example of a system for enhanced searching of data in a computer memory according to some aspects.

There can be disadvantages to sequentially searching for each key in a set of keys to determine which of the keys are stored in a computer memory. For example, this sequential searching process can consume a large amount of processing power (e.g., require a high number of processing cycles) and take a significant amount of time to complete, during which the processing device may be prevented from performing other tasks. It may also consume large amounts of other computing resources.

Some examples of the present disclosure overcome one or more of the abovementioned issues by searching for keys in a set of values using an iterative memory-searching process in which the set of keys is repeatedly divided in half and the middle key is searched for, rather than searching for the keys in a sequential order. The location of the middle key in the set of values is then used to define a subrange of the set of values in which to search for a next key in a subsequent iteration of the memory-searching process. More specifically, each iteration of the memory-searching process can (i) divide a range of keys in half at a middle key, (ii) search for the middle key in a set of values to identify the position of the middle key in the set of values, and (iii) use the position of the middle key in the set of values to determine a subrange of the set of values in which to search for the next key in the next iteration. This can result in each subsequent iteration of the memory-searching process searching for a key in a smaller and smaller portion of the set of values. In this manner, information determined during each iteration of the memory-searching process is used to refine the search performed in a subsequent iteration, which can significantly reduce the overall processing power, time, and memory required to search for the keys in the set of values.

As a particular example, in the first iteration of the memory-searching process, the set of keys is divided into two halves separated by a middle key (at position ½ in the set of keys), and the middle key is searched for in the set of values. In the second iteration, each of the two halves are again divided into two halves separated by respective middle keys (at positions ¼ and ¾ in the set of keys), which are searched for in the set of values. In the third iteration, each of the halves are again divided into halves separated by respective middle keys (at positions ⅛, ⅜, ⅝, and ⅞ in the set of keys), which are searched for in the set of values. During each subsequent iteration, the existing halves are again divided in half at respective middle keys, which are then searched for in the set of values. This process can be repeated until all of the keys have been searched for in the computer memory.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for enhanced searching of data in a computer memory 104 according to some aspects. In this example, the system 100 is a data storage and retrieval system, but other examples can involve other types of systems.

The system 100 can include a processing device 102. The processing device 102 can include one processing device or multiple processing devices. Non-limiting examples of the processing device 102 include a Field-Programmable Gate Array (FPGA), an application-specific integrated circuit (ASIC), a microprocessor, etc. The processing device 102 can execute one or more operations for implementing enhanced searching of data in a computer memory 104. The processing device 102 can execute instructions stored in the computer memory 104 to perform the operations. In some examples, the instructions can include processor-specific instructions generated by a compiler or an interpreter from code written in any suitable computer-programming language, such as C, C++, C #, etc.

The processing device 102 can be communicatively coupled to a memory controller 106. The memory controller 106 can include a processing device, circuitry, software, firmware, or any combination of these to enable to the memory controller 106 to implement a memory-searching process 110. The memory-searching process 110 can be iterative, recursive, or both. The memory-searching process 110 can be for identifying which, if any, keys in a set of keys 108 are located in a set of values 112. The memory-searching process 110 is described in greater detail below.

The memory controller 106 can be communicatively coupled to a computer memory 104. The computer memory 104 can include one memory device or multiple memory devices. The computer memory 104 can be non-volatile and may include any type of memory device that retains stored information when powered off. Non-limiting examples of the computer memory 104 include electrically erasable and programmable read-only memory (EEPROM), flash memory, or any other type of non-volatile memory. In some examples, at least some of the memory device can include a medium from which the processing device 102 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The processing device 102 can transmit commands to the memory controller 106, which can perform one or more operations in response to the commands. The operations can be memory operations. Examples of the memory operations can include a read operation, a write operation, a search operation, or any combination of these. For example, the processing device 102 can transmit high-level commands to the memory controller 106 for accessing data stored in a particular portion of the computer memory 104. The memory controller 106 can receive the high-level commands and perform a read operation to obtain the data from the particular portion of the computer memory 104. The memory controller 106 can then transmit a response, which may or may not include the data, back to the processing device 102. In some examples, the memory controller 106 can perform a search operation in response to a command from the processing device 102. The search operation can involve implementing the memory-searching process 110 to determine which, if any, keys in a set of keys 108 are in a set of values 112.

The set of keys 108 can be determined or received by the processing device 102. For example, the processing device 102 can receive the set of keys 108 as user input, from a remote computing device, from a database, via a network, or from another source. In one example, the processing device 102 can receive the set of keys 108 via a network as part of an electronic query. After determining or receiving the set of keys 108, the processing device 102 can transmit the set of keys 108 to the memory controller 106, which can implement the memory-searching process 110 to determine which keys in the set of keys 108 exist in the computer memory 104. For example, the memory controller 106 can implement the memory-searching process 110 to determine which keys in the set of keys 108 exist in a set of values 112 stored in the computer memory 104. The memory controller 106 can return the results of the search back to the processing device 102. In some examples, the results of the search can include a list of keys that exist, or do not exist, in the set of values 112. The processing device 102 may then execute one or more operations based on the results of the search. For example, the processing device 102 can execute one or more operations in response to identifying an overlap between the set of keys 108 and the set of values 112.

One example of program code for implementing the memory-searching process 110 is shown in FIG. 2. In this example, the program code is separated into two functions, mmkbs and _mmkbs. The memory-searching process 110 can be initiated by calling function mmkbs with the appropriate arguments, which in this example include arr, N, keys, M, and results. The argument arr can be a sorted array or list of values to search through, such as the set of values 112. The argument N can be the number of elements in the array arr (e.g., the size of the array). The argument keys can be a sorted array or list of keys to search for in arr. The argument M can be the number of elements in the array keys. The argument results can be an array indicating which keys are in, or not in, the array arr. The function mmkbs can receive these arguments and then call function _mmkbs.

The function _mmkbs can have its own arguments, which can include arr, arr_l, arr_r, keys, keys_l, keys_r, and results. The arguments arr, keys, and results can be similar to those discussed above. The argument arr_l can be a position number of a value that defines a lower value-boundary in arr, and the argument arr_r can be a position number of a value that defines an upper value-boundary in arr. The lower value-boundary and the upper value-boundary can define a range of values in arr in which to search for a key. The argument keys_l can be a position number of a key that defines a lower key-boundary in keys, and the argument keys_r can be a position number of a key that defines an upper key-boundary in keys. The lower key-boundary and the upper key-boundary can define a range of keys in keys.

The function _mmkbs can begin by determining if the number of elements between the upper key-boundary (keys_r) and the lower key-boundary (keys_l) is less than zero. If so, the function can return. Otherwise, the position of the middle key in the array keys can be identified. This can be implemented by calling the function MIDDLE, which can accept the lower key-boundary (keys_l) and the upper key-boundary (keys_r) as arguments. The function MIDDLE can then determine the position of the middle key between the lower key-boundary and the upper key-boundary. The position of the middle key can then be stored in the variable keys_middle. If the result of the function MIDDLE is not an integer (e.g., because there is an even number of keys in the array keys), the result can be rounded up or down to identify the position of the next closest key to the middle, which can be stored in the variable keys_middle.

Once the position of the middle key is identified, the function can determine if the numerical value of the middle key falls outside the range of values defined by the boundaries arr_l and arr_r. For example, in lines 10-14 of FIG. 2, the function can determine if the value of the middle key is lower than the value for arr_l. If so, the function discards half of the keys in the array keys, because those keys are outside the range of values to be searched. The function discards half the keys by calling itself using an updated set of arguments, in which the value for keys_l is updated to be (keys_middle+1), among other things. As another example, in lines 15-19, the function can determine if the value of the middle key is higher than the value for arr_r. If so, the function discards half of the keys in the array keys, because those keys are outside the range of values to be searched. The function discards half the keys by calling itself using an updated set of arguments, in which the value for keys_r is updated to be (keys_middle−1), among other things.

Next, the function can perform a search to determine whether or not the middle key is in the array arr. In this example, the search is implemented by calling another function, bs, which can be a binary search process. An example of the binary search process is shown in FIG. 3. The binary search process can (i) identify the middle value in a range of values defined by a left boundary and a right boundary; (ii) determine if the key that is being searched for matches the middle value; and if not (iii) adjust the right boundary if the key is lower than the middle value or adjust the left boundary if the key is higher than the middle value. The binary search process can then iterate steps (i)-(iii) process until the key is found or all the values are searched. If the key is not in arr, the binary search process can return "false". Otherwise, the binary search process can return a position of the key in arr, which can be stored in the variable pos, as shown in line 22 of FIG. 2. And the function can store the value of pos in the results array, as shown in lines 24-25 of FIG. 2.

The function is also recursive. In line 27 of FIG. 2, the function calls itself using an updated set of arguments. The updated set of arguments can include, among other things, the argument arr_r being set to pos−1 (the position of the key in array arr minus one), and the value for the argument keys_r being set to (keys_middle−1). In lines 29-30, the function calls itself again using another updated set of arguments. This updated set of arguments can include, among other things, the value for the argument arr_l being set to either pos if the key was located in arr, or pos+1 if the key was not located in arr. Also, the value for keys_l can be set to (keys_middle+1). The combination of these recursive calls can result in keys being divided in half at the middle key, with the first recursive call being for searching the lower half of keys and the second recursive call being for searching the upper half of keys. As shown, the function _mmkbs can repeatedly call itself, with each iteration further subdividing the existing ranges of keys in half and searching for respective middle keys in arr. This process can iterate until some or all of the keys have been searched for in arr, and return the results in the array results.

The above-described program code is provided for illustrative purposes, and other implementations of the memory-searching process 110 can involve more steps, fewer steps, different steps, or a different combination of the steps discussed above. Also, the variable and function names are provided for illustrative purposes, but can be changed to other names as desired. In other examples, the functions may accept more arguments, fewer arguments, or a different combination of the arguments described above. Further, although the program code is provided in the programming language C, similar functionality can be implemented using any number and combination of other programming languages, such as C, Java, Perl, Python, or PHP.

Figure 4:
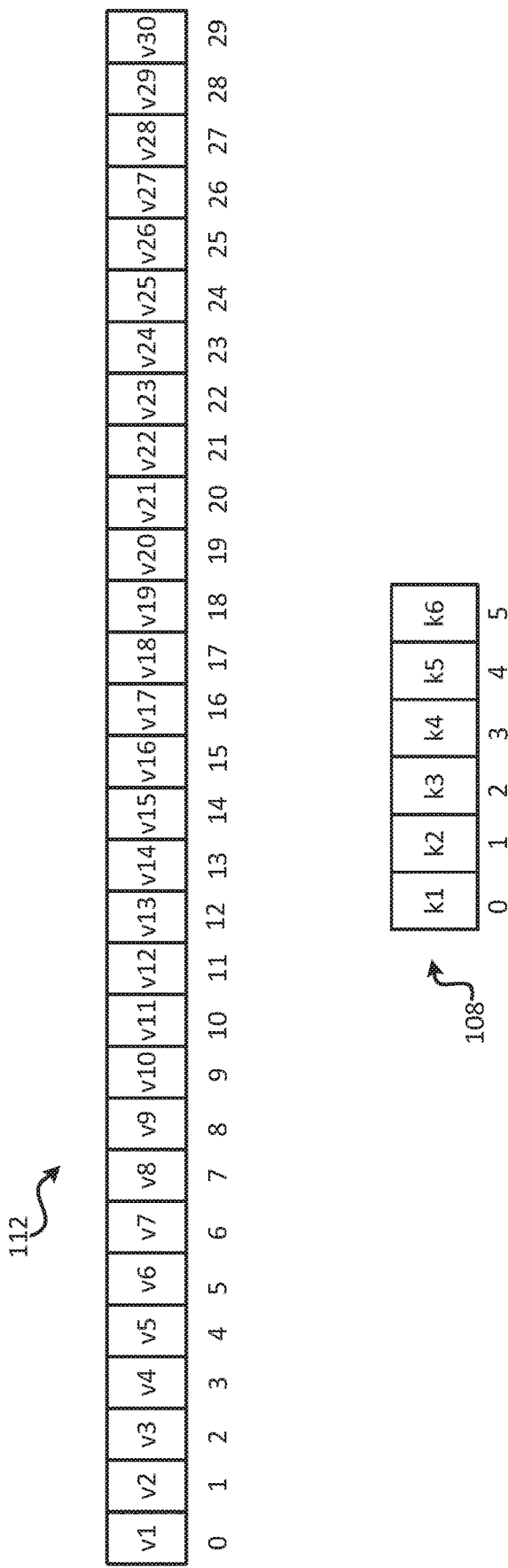
FIG. 4 is an example of a set of keys and a set of values according to some aspects.
Figure 5:
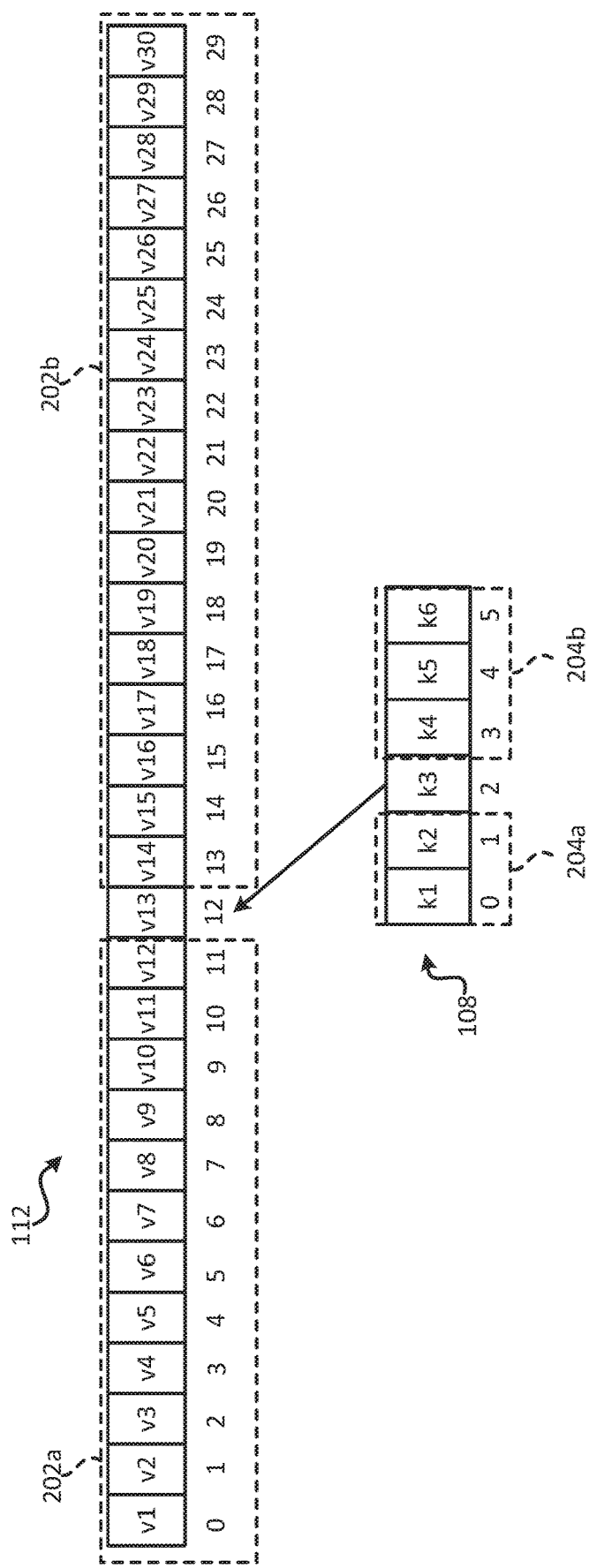
FIG. 5 is an example of a first iteration of a memory-searching process according to some aspects.
Figure 6:
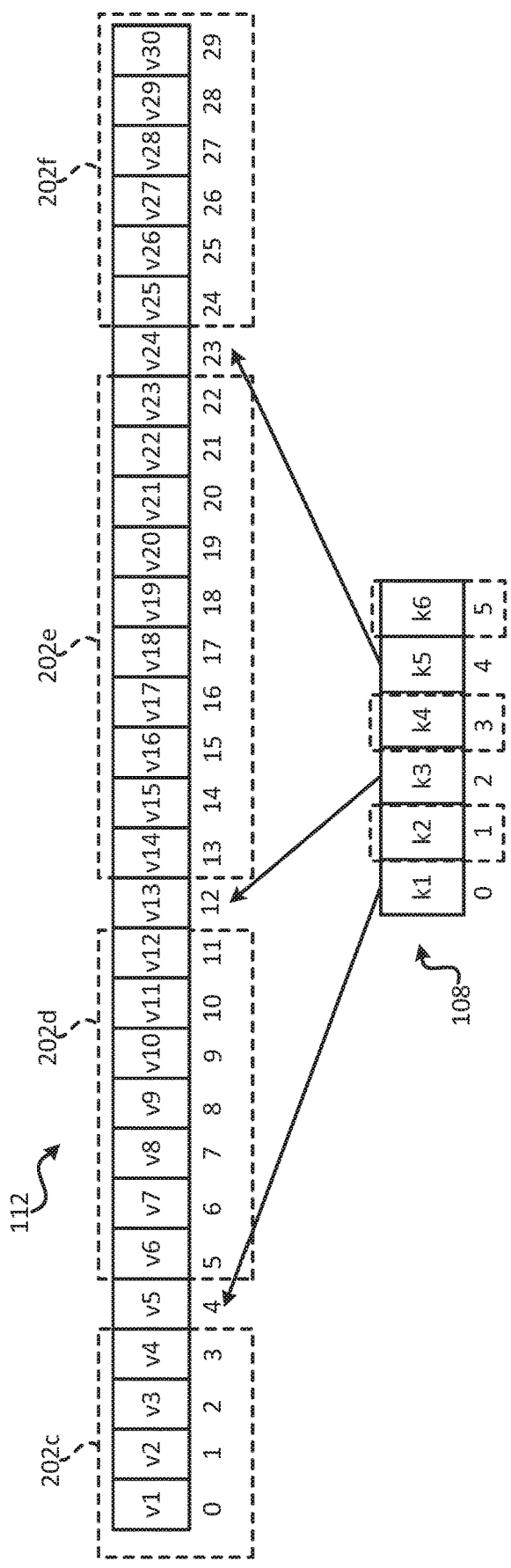
FIG. 6 is an example of a second iteration of a memory-searching process according to some aspects.

One example implementation of the memory-searching process 110 is shown in FIGS. 4-6. FIG. 4 shows the set of keys 108 represented as a group of boxes, where each box represents a key. Beneath each box is a number indicating the position of the key in the set of keys 108. For example, key k1 is in position 0 in the set of keys 108, key k2 is in position 1 in the set of keys 108, and so on. FIG. 4 also shows the set of values 112 represented as a group of boxes, where each box represents a value in the set of values 112. Beneath each box is a number indicating the position of the value in set of values 112. For example, value v1 is in position 0 in the set of values 112, value v2 is in position 1 in the set of values 112, and so on.

FIG. 5 shows an initial iteration of the memory-searching process 110, in which a middle key is identified in the set of keys 108. Because there are an even number of keys (six keys) in this illustrative set of keys 108, the next-lowest key or next-highest key from the middle can be selected. For example, key k3 can be selected as the middle key. On either side of key k3 are respective halves 204*a-b* of the set of keys 108 (although the two halves 204*a-b* are not identical in amount, the term "half" is used for ease of explanation). The set of values 112 can then be searched to determine if key k3 exists in the set of values 112. The set of values 112 can be searched using a binary search process or another approach. In this example, key k3 has been identified in position 12 of the set of values 112. That is, the value of key k3 matches the value v13. Because the set of keys 108 can be pre-sorted (e.g., in ascending or descending order), all of the keys to the left of key k3 in the set of keys 108 may have values that are below position 12 in the set of values 112. And all of the keys to the right of key k3 in the set of keys 108 may have values that are to the right of position 12 in the set of values 112. So, the memory-searching process 110 can then iterate using position 12 as an upper value-boundary (e.g., arr_r) for a first range of values 202*a* in which to search for a key in the left half 204*a* of the keys, and as a lower value-boundary (e.g., arr_l) for a second range of values 202*b* in which to search for another key in the right half 204*b* of the keys.

FIG. 6 shows the second iteration of the memory-searching process 110, in which a respective middle key is identified in each of the halves 204*a-b*. Because there are an even number of keys (two keys) in the left half 204*a*, the next-lowest key or next-highest key from the middle can be selected. For example, key k1 can be selected as the middle key for the left half 204*a*. And key k5 can be selected as the middle key for the right half 204*b*. The set of values 112 can then be searched to determine if keys k1 and k5 exist in the set of values 112. In this example, key k1 has been identified in position 4 of the set of values 112 and key k5 has been identified in position 23 of the set of values 112. That is, the value of key k1 matches the value v5 and the value of key k5 matches value v24. The remaining keys not yet searched are shown in dashed boxes in FIG. 6, and include keys k2, k4, and k6.

Key k2 falls between key k1 and key k3, which were identified at positions 4 and 12, respectively, in the set of values 112. So, the memory-searching process 110 can iterate using position 5 as a lower value-boundary and position 11 as an upper value-boundary for a range of values 202*d* in which to search for key k2. And key k4 falls between k3 and k5, which were identified at positions 12 and 23, respectively, in the set of values 112. So, the memory-searching process 110 can also iterate using position 13 as a lower value-boundary and position 22 as an upper value-boundary for another range of values 202*e* in which to search for key k4. And key k6 falls after key k5, which was identified at position 23 in the set of values 112. So, the memory-searching process 110 can iterate using position 24 as a lower value-boundary and position 29 as an upper value-boundary for yet another range of values 202*f* in which to search for key k6. This process can then be repeated until some or all the keys have been searched for in the set of values 112. Although the examples shown in FIGS. 4-6 have six keys and 30 values for illustrative purposes, the set of keys 108 can include any number and combination of keys and the set of values 112 can include any number and combination of values.

Figure 7:
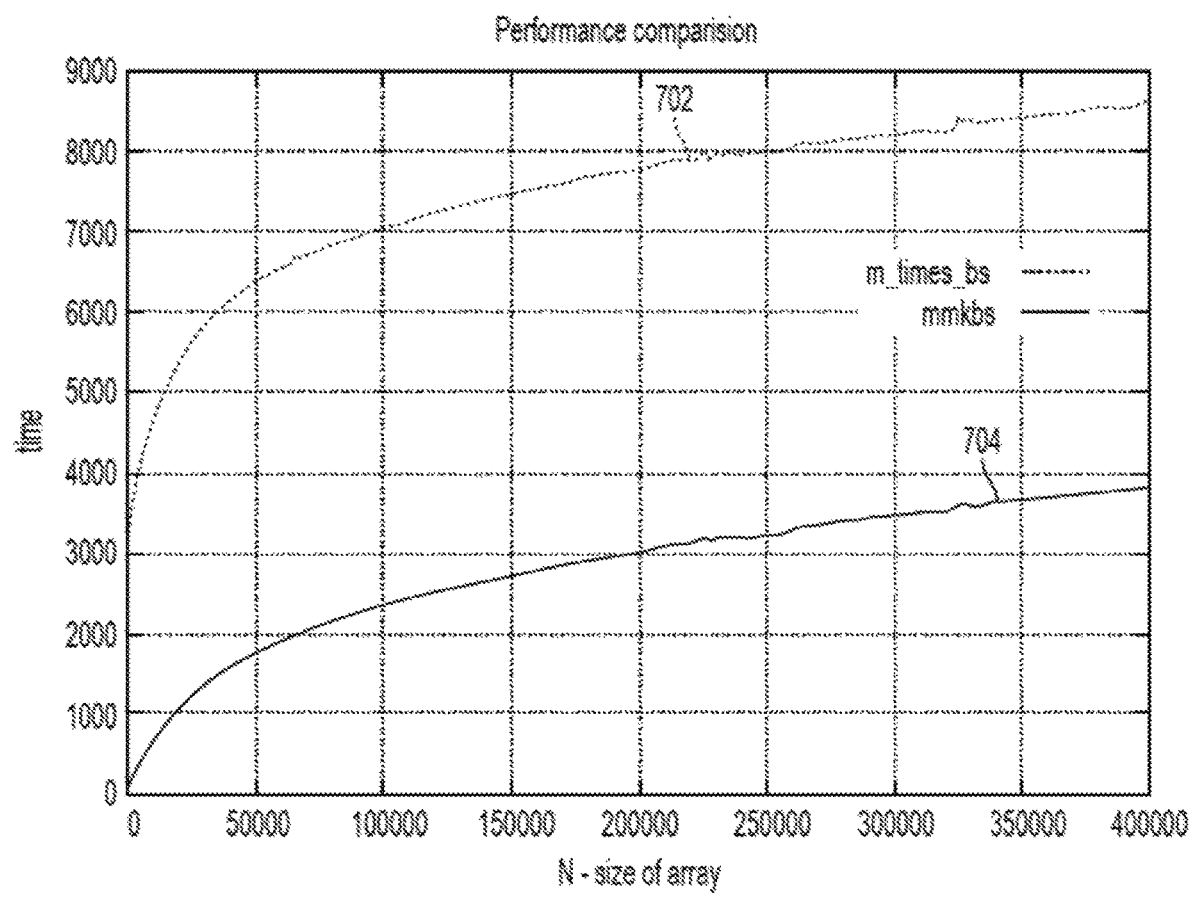
FIG. 7 is a graph of an example of the amount of time it takes to search for 50,000 keys in different sized sets of values using two different approaches according to some aspects.
Figure 8:
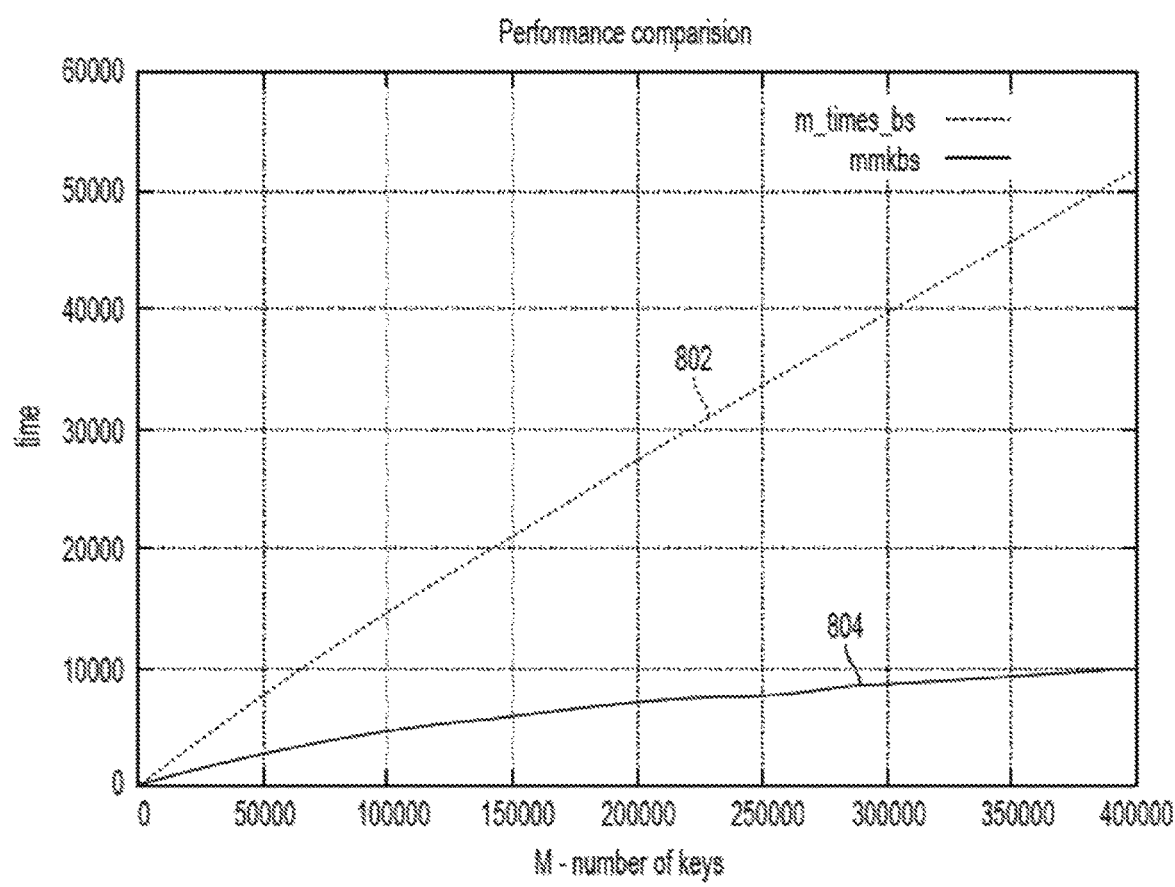
FIG. 8 is a graph of an example of the amount of time it takes to search for different sized sets of keys in a group of 200,000 values using two different approaches according to some aspects.

Searching for a set of keys 108 using the memory-searching process 110 can be significantly faster than other approaches. For example, FIG. 7 shows a graph indicating the amount of time it takes to search for a set of 50,000 keys in different sized sets of values using two approaches—a sequential approach indicated by line 702 and the memory-searching process 110 indicated by line 704. As shown, the memory-searching process 110 took less than half the amount of time (and in some instances, less than third of the amount of time) to search for the keys than the sequential approach. As another example, FIG. 8 shows a graph indicating the amount of time it takes to search for different sized sets of keys in a set of 200,000 values using the sequential approach, as indicated by line 802, and the memory-searching process 110, as indicated by line 804. As shown, the sequential approach grows linearly due to its quasilinear time complexity O(M*log(N)), while the memory-searching process 110 grows logarithmically due to its time complexity of:

$$O\left(\sum_{n=0}^{\log(M)} 2^n * \log\left(\frac{N}{2^n}\right)\right).$$

This can result in the memory-searching process 110 taking less than half the amount of time (and in some instances, less than a fifth of the amount of time) to search for the keys than the sequential approach.

Although the above examples are described with respect to the memory controller 106 implementing the memory-searching process 110, in other examples the processing device 102 can additionally or alternatively implement the memory-searching process 110. Also, some examples may include more components, fewer components, or a different arrangement of the components shown in FIG. 1. For example, the processing device 102 can be (or can include) the memory controller 106, or vice-versa. As another example, the system 100 may exclude the memory controller 106. Additionally, some or all of the components of FIG. 1 can be positioned within a single housing (e.g., a single computing device) or distributed and remote from one another, for example, so that communication between some or all of the components takes place via a network.

Figure 9:
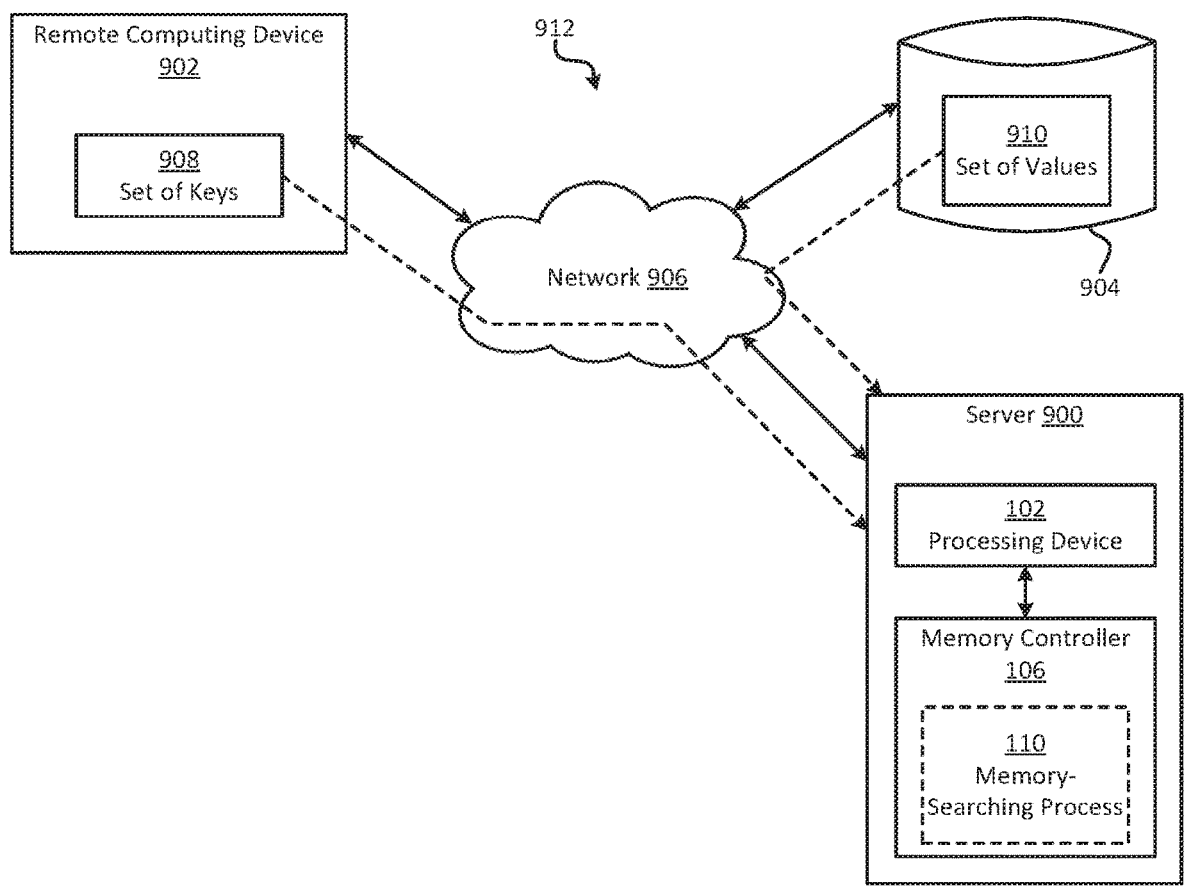
FIG. 9 is a block diagram of another example of a system for enhanced searching of data in a computer memory according to some aspects.

Another example of a system for enhanced searching of data in a computer memory is shown in FIG. 9. In this example, the system 912 includes a server 900 communicatively coupled to a remote computing device 902 and a database 904 via a network 906. Examples of the network 906 can include a wide area network (WAN), a local area network (LAN), the Internet, or any combination of these.

The remote computing device 902 can be any suitable type of computing device, such as a laptop computer, desktop computer, server, mobile phone, or any combination of these. In some examples, the remote computing device 902 can transmit a set of keys 908 to the server 900 via the network 906, as shown by a dashed line. In other examples, the remote computing device 902 can directly transmit the set of keys 908 to the server 900, such as via a direct wired or wireless connection.

The server 900 can receive the set of keys 908 and determine which of the keys are in a set of values 910. For example, the server 900 can obtain the set of values 910 directly or indirectly from the database 904, such as via the network 906, as shown by another dashed line. The server 900 can then implement the memory-searching process 110 to determine which of the keys are in a set of values 910.

In the example shown in FIG. 9, the memory controller 106 implements the memory-searching process 110. For example, the processing device 102 can receive the set of keys 908 from the remote computing device 902 and transmit the set of keys 908 to the memory controller 106. The processing device 102 can also receive the set of values 910 from the database 904 and transmit the set of values 910 to the memory controller 106. The memory controller 106 can then implement the memory-searching process 110 to determine which keys in the set of keys 908 are in the set of values 910. In some examples, the memory controller 106 can then transmit an electronic signal to the processing device 102 indicating one or more overlapping values between the set of keys 908 and the set of values 910. The processing device 102 can receive the electronic signal and responsively execute one or more operations. The one or more operations can include transmitting an electronic communication to the remote computing device 902, the database 904, or both indicating the overlapping values between the set of keys 908 and the set of values 910.

In other examples, the processing device 102 can implement the memory-searching process 110. For example, the processing device 102 can receive the set of keys 908 from the remote computing device 902, receive the set of values 910 from the database 904, and implement the memory-searching process 110 to determine which keys in the set of keys 908 are in the set of values 910. In some examples, the processing device 102 can then transmit an electronic signal to the memory controller 106 indicating one or more overlapping values between the set of keys 908 and the set of values 910. The memory controller 106 can receive the electronic signal and responsively execute one or more operations, such as a write operation to store the overlapping values in a computer memory of the server 900. Additionally or alternatively, the processing device 102 can execute one or more operations in response to determining the one or more overlapping values between the set of keys 908 and the set of values 910.

In one particular example, the set of keys 108 can be hundreds or thousands of keys to be searched for in the database 904. The server 900 can access the database 904, load some or all of the values in the database 904 into a local memory (e.g., RAM) for use as the set of values 910, and then implement the memory-searching process 110 to determine which keys in the set of keys 108 are in the database 904. This can be a much faster way of searching a database for information than using alternative approaches, and can also require fewer computing resources than the alternative approaches.

Some examples may include more components, fewer components, or a different arrangement of the components shown in FIG. 9. For example, the server 900 can include the database 904. In such an example, the database 904 may be included in a computer memory, such as the computer memory 104 of FIG. 1. Also, in other examples, another type of computing device other than the server 900 can implement the memory-searching process 110. For example, a desktop computer, laptop computer, mobile phone, tablet, e-reader, game system, or wearable device can implement the memory-searching process 110.

In some examples, the memory-searching process 110 can be implemented using one or more parallelization techniques, for example, such that at least two iterations of the memory-searching process 110 are implemented in parallel with one another. In one such example, the system 912 can include multiple servers (e.g., a cluster of servers) in communication with one another, such as in a cloud computing environment. The server 900 can implement a first iteration of the memory-searching process 110 to identify boundaries for two subsequent iterations of the memory-searching process 110. These two subsequent iterations can then be performed by two servers in parallel. The output of these two subsequent iterations can be further-refined boundaries for the next four iterations of the memory-searching process 110. These next four iterations can then be processed by four servers in parallel. And so on. Although this example involves multiple servers implementing the memory-searching process 110 in parallel, other examples can involve the memory-searching process 110 being implemented using other parallelization techniques. For example, the memory-searching process 110 can be implemented using multiple processing devices in the same server 900 in parallel. As another example, the memory-searching process 110 be implemented using multiple processing-threads in the same processing device 102 in parallel. In some examples, parallelization of the memory-searching process 110 can significantly reduce the amount of time it takes to complete the memory-searching process 110, and may reduce the processing load on each individual server or processing device.

Figure 10:
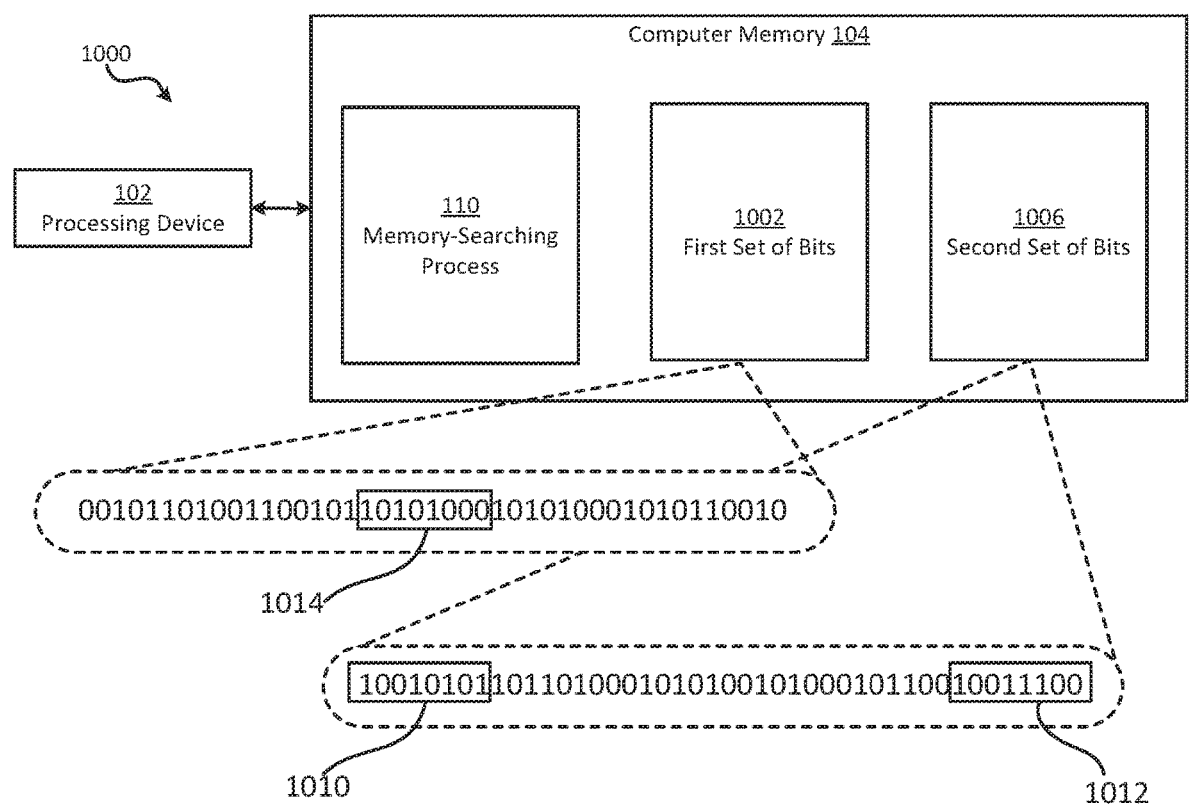
FIG. 10 is a block diagram of another example of a system for enhanced searching of data in a computer memory according to some aspects.

Another example of a system for enhanced searching of data in a computer memory is shown in FIG. 10. This example includes the processing device 102 communicatively coupled to the computer memory 104. The computer memory 104 includes the memory-searching process 110, a first set of bits 1002 representative of a range of keys, and a second set of bits 1006 representative of a range of values. Examples of the first set of bits 1002 and the second set of bits 1006 are shown in dashed ovals. As shown, the second set of bits 1006 can be defined by a lower bit-boundary 1010 and an upper bit-boundary 1012. The first set of bits 1002 can also be defined by a lower bit-boundary and an upper bit-boundary, which are not boxed in FIG. 10 for clarity.

The processing device 102 can implement the memory-searching process 110 by, for example, determining a group of bits 1014 associated with a key that is in the middle position in the range of keys represented by the first set of bits 1002. The processing device 102 can then determine that the group of bits 1014 is associated with a particular position in the range of values represented by the second set of bits 1006. The processing device 102 can then execute another iteration of the memory-searching process based on (i) the lower bit-boundary, (ii) the particular position associated with the group of bits, and (iii) the middle position of the key. Additionally or alternatively, the processing device 102 can execute another iteration of the memory-searching process based on (i) the particular position associated with the group of bits, (ii) the upper bit-boundary, and (iii) the middle position of the key.

Although the computer memory 104 is shown as a single unit in FIG. 10, in other examples the computer memory 104 can include multiple computer memories. For example, the computer memory 104 can include a first computer memory having the first set of bits 1002 and a second computer memory having the second set of bits 1006. In one such example, the first computer memory may be RAM and the second computer memory may be a hard drive. In some examples, the processing device 102 and the first computer memory can be included in a particular computing device, such as a server. The second computer memory can be remote from the computing device. For example, the second computer memory can be geographically remote from the computing device and accessible via a network. Other examples may include more components, fewer components, or a different arrangement of the components shown in FIG. 10.

Figure 11:
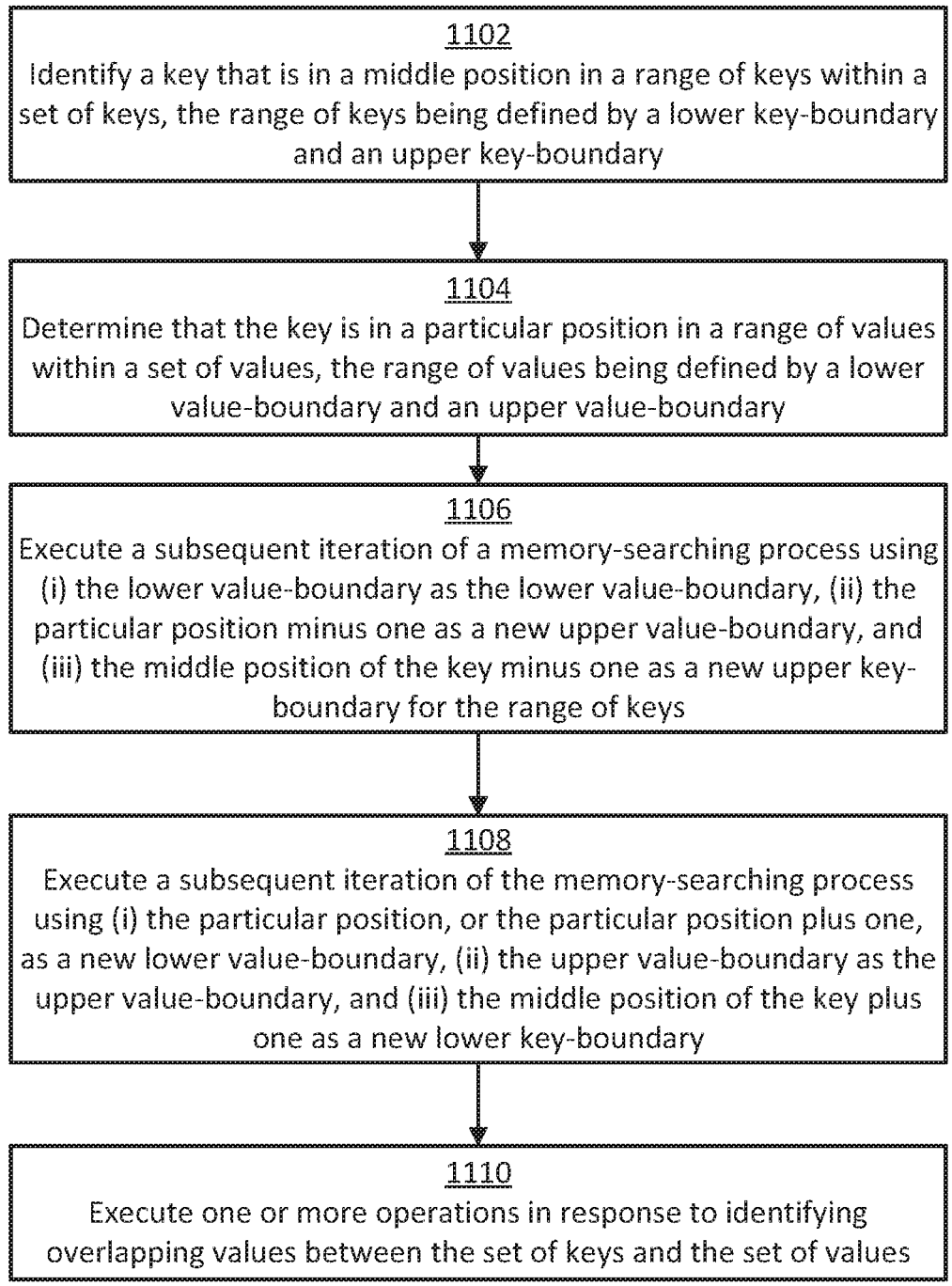
FIG. 11 is a flow chart of an example of a process for enhanced searching of data in a computer memory according to some aspects.

FIG. 11 is a flow chart of an example of a process for enhanced searching of data in a computer memory according to some aspects. Other examples can include more steps, fewer steps, different steps, or a different combination of steps than shown in FIG. 11. The steps below are described with reference to components discussed above.

In block 1102, a hardware component identifies a key that is in a middle position in a range of keys within a set of keys, the range of keys being defined by a lower key-boundary and an upper key-boundary. Examples of the hardware component can include the processing device 102, the memory controller 106, or both. Examples of the set of keys can include set of keys 108 or set of keys 908. The hardware component can identify the key in the middle position in the range of keys using the equation (((lower key-boundary)+ (upper key-boundary))/2).

In block 1104, the hardware component determines that the key is in a particular position in a range of values within a set of values, the range of values being defined by a lower value-boundary and an upper value-boundary. Examples of the set of values can include set of values 112 and set of values 910. The hardware component can determine that the key is in the particular position in the range of values using a binary search process or another search process.

In block 1106, the hardware component executes a subsequent iteration of the memory-searching process using (i) the lower value-boundary as the lower value-boundary, (ii) the particular position minus one as a new upper value-boundary, and (iii) the middle position of the key as a new upper key-boundary for the range of keys. For example, as shown in line 26 of FIG. 2, another iteration of the memory-searching process can be executed by calling a function for the memory-searching process using a set of arguments in which arr_l is set as the lower value-boundary, arr_r is set as the particular position of the key minus one, and M is set as keys_middle (the middle position of the key).

In block 1108, the hardware component executes a subsequent iteration of the memory-searching process using (i) the particular position, or the particular position plus one, as a new lower value-boundary, (ii) the upper value-boundary as the upper value-boundary, and (iii) the upper key-boundary minus the middle position of the key as the new upper key-boundary. For example, as shown in lines 27-29 of FIG. 2, another iteration of the memory-searching process can be executed by calling a function for the memory-searching process using a set of arguments in which arr_l is set as the particular position, or the particular position plus one, as a new lower value-boundary; arr_r is set as the upper value-boundary; and M is set as upper key-boundary minus the middle position of the key (e.g., M−1−keys_middle).

In block 1110, the hardware component executes one or more operations in response to identifying overlapping values between the set of keys and the set of values. Examples of operations can include transmitting an electronic communication to a remote computing device via a network, displaying an output via a display device, storing information in a memory device (e.g., computer memory 104 or database 904), or any combination of these.

The following examples illustrate various implementations in accordance with one or more aspects of the present disclosure.

Example 1 is a data storage and retrieval system for a computer memory. The data storage and retrieval system comprises means for searching for a set of keys in a set of values stored in the computer memory using a memory-searching process that is recursive. The memory-searching process comprises, for each iteration in a plurality of iterations of the memory-searching process: identifying a key that is in a middle position in a range of keys within the set of keys, the key being a numerical value to search for in the set of values, the range of keys being defined by a lower key-boundary and an upper key-boundary; determining that the key is in a particular position in a range of values within the set of values, the range of values being defined by a lower value-boundary and an upper value-boundary; and performing at least one of: executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; or executing a subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary. The data storage and retrieval system also comprises means for executing one or more operations in response to identifying an overlap between the set of keys and the set of values.

Example 2 is the data storage and retrieval system of Example 1, wherein at least one iteration in the plurality of iterations of the memory-searching process comprises both: executing the subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and executing the subsequent iteration of the memory-searching process using (i) the particular position, or the particular position plus one, as the new lower value-boundary, (ii) the upper value-boundary as the upper value-boundary, and (iii) the middle position of the key plus one as a new lower key-boundary.

Example 3 is the data storage and retrieval system of any of Examples 1-2, wherein the at least one iteration of the plurality of iterations further comprises: prior to determining that the key is in the particular position in the range of values within the set of values, determining that the key is less than a value in the set of values at the lower value-boundary; and in response to determining that the key is less than the value at the lower value-boundary, discarding keys in the range of keys that are less than the key.

Example 4 is the data storage and retrieval system of any of Examples 1-3, wherein the at least one iteration of the plurality of iterations further comprises: prior to determining that the key is in the particular position in the range of values within the set of values, determining that the key is greater than a value in the set of values at the upper value-boundary; and in response to determining that the key is greater than the value at the upper value-boundary, discarding keys in the range of keys that are greater than the key.

Example 5 is the data storage and retrieval system of any of Examples 1-4, wherein determining that the key is in the particular position in the range of values comprises using a binary search process to determine the particular position of the key in the range of values.

Example 6 is the data storage and retrieval system of any of Examples 1-5, wherein the means for searching for the set of keys in the set of values is a memory controller or a processing device, and wherein the computer memory is a random access memory or a hard disk.

Example 7 is the data storage and retrieval system of any of Examples 1-6, wherein the set of keys are received via a network as part of an electronic query; the set of keys are sorted in an ascending or descending order; and the set of values are sorted in the ascending or descending order.

Example 8 is a method for reducing an amount of processing time for identifying an overlap between datasets stored in a computer memory. The method comprises identifying, by a processing device, overlapping values between a set of keys and a set of values stored in a computer memory using a memory-searching process. The memory-searching process includes, for each iteration in a plurality of iterations of the memory-searching process: identifying a key that is in a middle position in a range of keys within the set of keys, the range of keys being defined by a lower key-boundary and an upper key-boundary; determining that the key is in a particular position in a range of values within the set of values, the range of values being defined by a lower value-boundary and an upper value-boundary; and performing at least one of: executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; or executing a subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary. The method also includes executing one or more operations in response to identifying the overlapping values between the set of keys and the set of values. Some or all of the method steps can be implemented by a processing device, a memory controller, or both.

Example 9 is the method of Example 8, wherein at least one iteration in the plurality of iterations of the memory-searching process comprises both: executing the subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and executing the subsequent iteration of the memory-searching process using (i) the particular position, or the particular position plus one, as the new lower value-boundary, (ii) the upper value-boundary as the upper value-boundary, and (iii) the middle position of the key plus one as the new lower key-boundary.

Example 10 is the method of any of Examples 8-9, wherein at least one iteration of the plurality of iterations further comprises: prior to determining that the key is in the particular position in the range of values within the set of values, determining that the key is less than a value in the set of values at the lower value-boundary; and in response to determining that the key is less than the value at the lower value-boundary, discarding keys in the range of keys that are less than the key.

Example 11 is the method of any of Examples 8-10, wherein at least one iteration of the plurality of iterations further comprises: prior to determining that the key is in the particular position in the range of values within the set of values, determining that the key is greater than a value in the set of values at the upper value-boundary; and in response to determining that the key is greater than the value at the upper value-boundary, discarding keys in the range of keys that are greater than the key.

Example 12 is the method of any of Examples 8-11, wherein determining that the key is in the particular position in the range of values comprises using a binary search process to determine the particular position of the key in the range of values, and further comprising including the particular position of the key into a results array.

Example 13 is the method of any of Examples 8-12, further comprising receiving the set of keys from a remote computing device via a network and receiving the set of values from a database.

Example 14 is the method of any of Examples 8-13, further comprising sorting the set of keys in ascending order prior to implementing the memory-searching process.

Example 15 is a server comprising a memory controller and a processing device communicatively coupled to the memory controller. The memory controller is configured to receive a set of keys from a remote computing device via a network; receive a set of values from a database; search for the set of keys in the set of values using a memory-searching process. The memory-searching process comprises, for each iteration in a plurality of iterations of the memory-searching process: identifying a key that is in a middle position in a range of keys within the set of keys, the range of keys being defined by a lower key-boundary and an upper key-boundary; determining that the key is in a particular position in a range of values within the set of values, the range of values being defined by a lower value-boundary and an upper value-boundary; and performing at least one of: executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; or executing a subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary. The processing device is configured to: receive an electronic signal from the memory controller indicating one or more overlapping values between the set of keys and the set of values identified using the memory-searching process; and execute one or more operations in response to receiving the electronic signal from the memory controller.

Example 16 is the server of Example 15, wherein at least one iteration in the plurality of iterations of the memory-searching process comprises both: executing the subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and executing the subsequent iteration of the memory-searching process using (i) the particular position, or the particular position plus one, as the new lower value-boundary, (ii) the upper value-boundary as the upper value-boundary, and (iii) the middle position of the key plus one as the new lower key-boundary.

Example 17 is the server of any of Examples 15-16, wherein at least one iteration of the plurality of iterations further comprises: prior to determining that the key is in the particular position in the range of values within the set of values, determining that the key is less than a value in the set of values at the lower value-boundary; and in response to determining that the key is less than the value at the lower value-boundary, discarding keys in the range of keys that are less than the key.

Example 18 is the server of any of Examples 15-17, wherein at least one iteration of the plurality of iterations further comprises: prior to determining that the key is in the particular position in the range of values within the set of values, determining that the key is greater than a value in the set of values at the upper value-boundary; and in response to determining that the key is greater than the value at the upper value-boundary, discarding keys in the range of keys that are greater than the key.

Example 19 is the server of any of Examples 15-18, wherein determining that the key is in the particular position in the range of values comprises using a binary search process to determine the particular position of the key in the range of values.

Example 20 is the server of any of Examples 15-19, wherein the one or more operations comprises transmitting an electronic communication to the remote computing device via the network indicating the one or more overlapping values between the set of keys and the set of values.

Example 21 is the server of any of Examples 15-20, wherein the database is a computer memory that is internal to the server.

Example 22 is the server of any of Examples 15-21, wherein the processing device comprises the memory controller.

Example 23 is a non-transitory computer-readable medium comprising program code that is executable by a processing device for causing the processing device to: search for a set of keys in a set of values using a memory-searching process that comprises, for each iteration in a plurality of iterations of the memory-searching process: identifying a key that is in a middle position in a range of keys within the set of keys, the range of keys being defined by a lower key-boundary and an upper key-boundary; determining that the key is in a particular position in a range of values within the set of values, the range of values being defined by a lower value-boundary and an upper value-boundary; and performing at least one of: executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; or executing a subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary; and execute one or more operations in response to identifying an overlap between the set of keys and the set of values.

Example 24 is the non-transitory computer-readable medium of Example 23, further comprising program code that is executable by a processing device for causing the processing device to, for each iteration in the plurality of iterations: execute the subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and execute the subsequent iteration of the memory-searching process using (i) the particular position, or the particular position plus one, as the new lower value-boundary, (ii) the upper value-boundary as the upper value-boundary, and (iii) the middle position of the key plus one as the new lower key-boundary.

Example 25 is the non-transitory computer-readable medium of any of Examples 23-24, further comprising program code that is executable by a processing device for causing the processing device to, for each iteration in the plurality of iterations: determine if the key is less than a value in the set of values at the lower value-boundary; and in response to determining that the key is less than the value at the lower value-boundary, discard keys in the range of keys that are less than the key.

Example 26 is the non-transitory computer-readable medium of any of Examples 23-25, further comprising program code that is executable by a processing device for causing the processing device to, for each iteration in the plurality of iterations: determine if the key is greater than a value in the set of values at the upper value-boundary; and in response to determining that the key is greater than the value at the upper value-boundary, discard keys in the range of keys that are greater than the key.

Example 27 is the non-transitory computer-readable medium of any of Examples 23-26, wherein determining that the key is in the particular position in the range of values comprises using a binary search process to determine the particular position of the key in the range of values.

Example 28 is the non-transitory computer-readable medium of any of Examples 23-27, further comprising program code that is executable by a processing device for causing the processing device to sort the set of keys in a particular order prior to searching for the set of keys in the set of values using the memory-searching process.

Example 29 is the non-transitory computer-readable medium of any of Examples 23-28, wherein the one or more operations comprises transmitting an electronic communication to a remote computing device, the electronic communication indicating the overlap between the set of keys and the set of values.

Example 30 is the non-transitory computer-readable medium of any of Examples 23-29, further comprising program code that is executable by a processing device for causing the processing device to sort the set of values in the particular order prior to searching for the set of keys in the set of values using the memory-searching process.

Example 31 is a system comprising a processing device and a computer memory. The computer memory includes a first set of bits stored in a first portion of the computer memory; a second set of bits stored in a second portion of the computer memory, the second set of bits being defined by a lower bit-boundary and an upper bit-boundary; and program code for a memory-searching process that is iterative and recursive, the program code being executable by the processing device for causing the processing device to, for each iteration of a plurality of iterations of the memory-searching process: determine a group of bits associated with a key that is in a middle position in a range of keys represented in the computer memory by the first set of bits; determine that the group of bits is associated with a particular position in a range of values represented in the computer memory by the second set of bits; execute another iteration of the memory-searching process based on (i) the lower bit-boundary, (ii) the particular position associated with the group of bits, and (iii) the middle position of the key; and execute another iteration of the memory-searching process based on (i) the particular position associated with the group of bits, (ii) the upper bit-boundary, and (iii) the middle position of the key.

Example 32 is the system of Example 31, wherein the computer memory includes a first computer memory having the first set of bits and a second computer memory having the second set of bits.

Example 33 is the system of Example 32, wherein the first computer memory is a random access memory and the second computer memory is a hard drive.

Example 34 is the system of Example 32, wherein the processing device and the first computer memory are included in a server and the second computer memory is remote from the server and accessible via a network.

Example 35 is the system of any of Examples 31-34, wherein the program code for the memory-searching process further comprises additional program code that is executable by the processing device for causing the processing device to, for each iteration in the plurality of iterations: determine if the key is less than a value associated with the lower bit-boundary; and in response to determining that the key is less than the value associated with the lower bit-boundary, discard keys in the range of keys that are less than the key.

Example 36 is the system of any of Examples 31-35, wherein the program code for the memory-searching process further comprises additional program code that is executable by the processing device for causing the processing device to, for each iteration in the plurality of iterations: determine if the key is greater than a value associated with the upper bit-boundary; and in response to determining that the key is greater than the value associated with the upper bit-boundary, discard keys in the range of keys that are greater than the key.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A data storage and retrieval system for a computer memory, the data storage and retrieval system comprising:
   means for receiving, from a source, a set of keys to be searched for in a set of values stored in the computer memory;
   means for searching for the set of keys in the set of values stored in the computer memory using a memory-searching process that is recursive and configured to iterate until a stopping condition is satisfied, wherein the memory-searching process includes, for each iteration in a plurality of iterations of the memory-searching process:
   identifying a key that is in a middle position in a range of keys within the set of keys, the key being a numerical value to search for in the set of values, the range of keys being defined by a lower key-boundary and an upper key-boundary;

determining that the key is in a particular position in a range of values within the set of values, the range of values being defined by a lower value-boundary and an upper value-boundary;

storing data in memory indicating that the key is present in the range of values;

executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and executing another subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary; and means for executing one or more operations in response to identifying an overlap between the set of keys and the set of values, wherein the one or more operations include using the data stored in memory to provide an indication to the source of which keys from among the set of keys are present in the range of values.

2. The data storage and retrieval system of claim 1, wherein at least one iteration of the plurality of iterations further comprises:

prior to determining that the key is in the particular position in the range of values within the set of values:
determining that the key is less than a value in the set of values at the lower value-boundary; and
in response to determining that the key is less than the value at the lower value-boundary, discarding keys in the range of keys that are less than the key.

3. The data storage and retrieval system of claim 1, wherein at least one iteration of the plurality of iterations further comprises:

prior to determining that the key is in the particular position in the range of values within the set of values:
determining that the key is greater than a value in the set of values at the upper value-boundary; and
in response to determining that the key is greater than the value at the upper value-boundary, discarding keys in the range of keys that are greater than the key.

4. The data storage and retrieval system of claim 1, wherein determining that the key is in the particular position in the range of values comprises using a binary search process to determine the particular position of the key in the range of values.

5. The data storage and retrieval system of claim 1, wherein the means for searching for the set of keys in the set of values is a memory controller or a processing device, and wherein the computer memory is a random access memory or a hard disk.

6. The data storage and retrieval system of claim 1, wherein:

the set of keys are received via a network as part of an electronic query;

the set of keys are sorted in an ascending or descending order; and the set of values are sorted in the ascending or descending order.

7. The data storage and retrieval system of claim 1, wherein the means for receiving the set of keys is a processing device and the means for executing the one or more operations is the processing device.

8. A method for reducing an amount of processing time associated with in searching a computer memory, the method comprising:

receiving, by a computing system and from a source, a set of keys to be searched for in a set of values stored in the computer memory;

identifying, by the computing system, overlapping values between the set of keys and the set of values stored in the computer memory using a memory-searching process that is configured to iterate until a stopping condition is satisfied, wherein the memory-searching process includes, for each iteration in a plurality of iterations of the memory-searching process:

identifying a key that is in a middle position in a range of keys within the set of keys, the range of keys being defined by a lower key-boundary and an upper key-boundary;

determining that the key is in a particular position in a range of values within the set of values, the range of values being defined by a lower value-boundary and an upper value-boundary;

storing data in memory indicating that the key is present in the range of values;

executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and executing another subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary; and providing, by the computing system and based on the data stored in memory, an indication to the source of which keys among the set of keys are present in the range of values.

9. The method of claim 8, wherein at least one iteration of the plurality of iterations further comprises:

prior to determining that the key is in the particular position in the range of values within the set of values:
determining that the key is less than a value in the set of values at the lower value-boundary; and
in response to determining that the key is less than the value at the lower value-boundary, discarding keys in the range of keys that are less than the key.

10. The method of claim 8, wherein at least one iteration of the plurality of iterations further comprises:

prior to determining that the key is in the particular position in the range of values within the set of values:
determining that the key is greater than a value in the set of values at the upper value-boundary; and
in response to determining that the key is greater than the value at the upper value-boundary, discarding keys in the range of keys that are greater than the key.

11. The method of claim 8, wherein determining that the key is in the particular position in the range of values comprises using a binary search process to determine the particular position of the key in the range of values, and further comprising including the particular position of the key into a results array.

12. The method of claim 8, further comprising receiving the set of keys from a remote computing device via a network and receiving the set of values from a database.

13. The method of claim 8, further comprising sorting the set of keys and the set of values in ascending order or descending order prior to implementing the memory-searching process.

14. A system comprising:
a memory controller configured to:
receive a set of keys from a remote computing device via a network;
receive a set of values from a database;
search for the set of keys in the set of values using a memory-searching process that is configured to iterate until a stopping condition is satisfied, wherein the memory-searching process includes, for each iteration in a plurality of iterations of the memory-searching process:
identifying a key that is in a middle position in a range of keys within the set of keys, the range of keys being defined by a lower key-boundary and an upper key-boundary;
determining that the key is in a particular position in a range of values within the set of values, the range of values being defined by a lower value-boundary and an upper value-boundary;
storing data indicating that the key is present in the range of values; and
performing at least one of:
executing a subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; or
executing a subsequent iteration of the memory-searching process using (i) the particular position, or the particular position plus one, as a new lower value-boundary, (ii) the upper value-boundary as the upper value-boundary, and (iii) the middle position of the key plus one as a new lower key-boundary; and
a processing device communicatively coupled to the memory controller, the processing device being configured to:
receive an electronic signal generated by the memory controller based on the stored data, the electronic signal indicating one or more overlapping values between the set of keys and the set of values identified using the memory-searching process; and
execute one or more operations in response to receiving the electronic signal from the memory controller, the one or more operations comprising transmitting an electronic communication to the remote computing device via the network indicating the one or more overlapping values between the set of keys and the set of values.

15. The system of claim 14, wherein at least one iteration in the plurality of iterations of the memory-searching process comprises both:
executing the subsequent iteration of the memory-searching process using (i) the lower value-boundary as the lower value-boundary, (ii) the particular position minus one as a new upper value-boundary, and (iii) the middle position of the key minus one as a new upper key-boundary for the range of keys; and
executing another subsequent iteration of the memory-searching process using (i) the particular position, or the particular position plus one, as the new lower value-boundary, (ii) the upper value-boundary as the upper value-boundary, and (iii) the middle position of the key plus one as the new lower key-boundary.

16. The system of claim 14, wherein at least one iteration of the plurality of iterations further comprises:
prior to determining that the key is in the particular position in the range of values within the set of values:
determining that the key is less than a value in the set of values at the lower value-boundary; and
in response to determining that the key is less than the value at the lower value-boundary, discarding keys in the range of keys that are less than the key.

17. The system of claim 14, wherein at least one iteration of the plurality of iterations further comprises:
prior to determining that the key is in the particular position in the range of values within the set of values:
determining that the key is greater than a value in the set of values at the upper value-boundary; and
in response to determining that the key is greater than the value at the upper value-boundary, discarding keys in the range of keys that are greater than the key.

18. The system of claim 14, wherein determining that the key is in the particular position in the range of values comprises using a binary search process to determine the particular position of the key in the range of values.

19. The system of claim 14, wherein:
the database is stored in a computer memory that is internal to the system; and
the processing device includes the memory controller.

20. The system of claim 14, wherein the memory controller and the processing device are parts of a server.

* * * * *